(12) United States Patent
Li et al.

(10) Patent No.: US 11,996,952 B2
(45) Date of Patent: May 28, 2024

(54) INFORMATION SYNCHRONIZATION METHOD, TERMINAL AND INFORMATION SYNCHRONIZATION SYSTEM

(71) Applicant: BOE TECHNOLOGY GROUP CO., LTD., Beijing (CN)

(72) Inventors: Hongyang Li, Beijing (CN); Xiangxiang Zou, Beijing (CN); Shuai Yang, Beijing (CN); Naifu Wu, Beijing (CN); Sujia Jiang, Beijing (CN); Zhe Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 159 days.

(21) Appl. No.: 17/626,537

(22) PCT Filed: Mar. 3, 2021

(86) PCT No.: PCT/CN2021/078890
§ 371 (c)(1),
(2) Date: Jan. 12, 2022

(87) PCT Pub. No.: WO2021/196963
PCT Pub. Date: Oct. 7, 2021

(65) Prior Publication Data
US 2022/0263679 A1    Aug. 18, 2022

(30) Foreign Application Priority Data
Mar. 30, 2020 (CN) .......................... 202010239147.1

(51) Int. Cl.
*H04L 12/28* (2006.01)

(52) U.S. Cl.
CPC ...... *H04L 12/2807* (2013.01); *H04L 12/2816* (2013.01); *H04L 12/2834* (2013.01)

(58) Field of Classification Search
None
See application file for complete search history.

(56) References Cited

U.S. PATENT DOCUMENTS

| | | | |
|---|---|---|---|
| 6,314,408 B1 * | 11/2001 | Salas | G06F 16/958 |
| | | | 707/E17.116 |
| 2002/0029256 A1 * | 3/2002 | Zintel | H04L 61/30 |
| | | | 709/218 |

(Continued)

FOREIGN PATENT DOCUMENTS

| | | |
|---|---|---|
| CN | 101107600 A | 1/2008 |
| CN | 103558836 A | 2/2014 |

(Continued)

OTHER PUBLICATIONS

Office Action dated Jul. 5, 2021 and Search Report dated Jun. 25, 2021, issued in counterpart CN Application No. 202010239147.1, with English Machine Translation. (21 pages).

*Primary Examiner* — Philip J Chea
*Assistant Examiner* — James Ross Hollister
(74) *Attorney, Agent, or Firm* — WHDA, LLP

(57) ABSTRACT

An information synchronization method, a terminal and a system, which relates to the technical field of communication. The method includes: by the first terminal, sending a controlling request of a target terminal to the controlling server; by the first terminal, receiving a state feedback information sent by the first terminal, according to the state feedback information, updating an information of the first terminal; and by the first terminal, sending the state feedback information to each of the at least one second terminal, so that the second terminal updates an information of the second terminal according to the state feedback information.

11 Claims, 7 Drawing Sheets

(56) References Cited

U.S. PATENT DOCUMENTS

| | | | |
|---|---|---|---|
| 2006/0253703 A1* | 11/2006 | Eronen | H04W 12/0433 |
| | | | 713/156 |
| 2009/0055537 A1 | 2/2009 | Takei et al. | |
| 2009/0106455 A1* | 4/2009 | Xu | H04L 51/234 |
| | | | 709/248 |
| 2016/0277496 A1 | 9/2016 | Zeng et al. | |
| 2016/0316000 A1 | 10/2016 | Huang et al. | |
| 2017/0124664 A1* | 5/2017 | Savenok | H04L 67/1074 |
| 2018/0227368 A1* | 8/2018 | Zhao | H04L 67/56 |
| 2019/0028985 A1* | 1/2019 | Wang | H04W 56/0015 |
| 2019/0222432 A1 | 7/2019 | Lin et al. | |
| 2022/0046561 A1* | 2/2022 | Huang | H04W 56/00 |

FOREIGN PATENT DOCUMENTS

| | | | |
|---|---|---|---|
| CN | 103856374 A | 6/2014 | |
| CN | 105009549 A | 10/2015 | |
| CN | 105281987 A | 1/2016 | |
| CN | 105357116 A | 2/2016 | |
| CN | 105791064 A | 7/2016 | |
| CN | 106302055 A | 1/2017 | |
| CN | 106603716 A | 4/2017 | |
| CN | 110266567 A | 9/2019 | |
| CN | 110488617 A | 11/2019 | |
| CN | 111416760 A | 7/2020 | |
| CN | 111965989 A | 11/2020 | |

\* cited by examiner

INFORMATION SYNCHRONIZATION METHOD, TERMINAL AND INFORMATION SYNCHRONIZATION SYSTEM

CROSS REFERENCE TO RELEVANT APPLICATIONS

The present disclosure claims the priority of the Chinese patent application filed on Mar. 30, 2020 filed to the Chinese Patent Office with the application number of 202010239147.1 and the title of "INFORMATION SYNCHRONIZATION METHOD, TERMINAL, AND INFORMATION SYNCHRONIZATION SYSTEM", the entire contents of which are incorporated herein in its entirety by reference.

TECHNICAL FIELD

The present disclosure relates to the technical field of communication, and particularly relates to an information synchronization method, a terminal and an information synchronization system.

BACKGROUND

With the development of smart home, various types of smart home hardware have already extensively come into common homes today. In projects of distributed smart-home control panels, it is required to install terminals such as control panels at multiple positions in a house, and therefore it is required to send instructions or requests to a home controlling server by the multiple terminals. Moreover, it is required each of the terminals to have a licence that permits to send information to the home controlling server.

Furthermore, it is further required to construct a middleground device to perform the state synchronization between the multiple terminals, and the main function of the middleground device is to distribute messages collectively. Referring to FIG. 1, if the terminal 1 sends a request to the server, for example, a request of lightening a lamp, then the server can merely feed back the state information to the terminal 1, for example, lightening a lamp icon of the terminal 1. However, because the state of the terminal 1 is also required to be synchronized to the terminal 2 and the terminal 3, or, in other words, it is also required the terminal 2 and the terminal 3 to lighten the lamp icon on their own pages that corresponds to the terminal 1, it is necessary to require the middleground device to distribute the feedback information simultaneously to the 3 terminals simultaneously.

SUMMARY

The present disclosure provides an information synchronization method, a terminal and an information synchronization system.

The present disclosure provides an information synchronization method, wherein the method is applied to a first terminal of an information synchronization system, the information synchronization system further comprises a controlling server and at least one second terminal, the first terminal and the at least one second terminal are located in a same local area network, and the method comprises:
sending a controlling request of a target terminal to the controlling server, wherein the target terminal refers to the first terminal or any one of the at least one second terminal;
receiving a state feedback information sent by the controlling server, and according to the state feedback information, updating an information of the first terminal; and
sending the state feedback information to each of the at least one second terminal, so that each of the at least one second terminal updates an information of the each of the at least one second terminal according to the state feedback information.

Optionally, the target terminal refers to the first terminal, and before the step of sending the controlling request of the target terminal to the controlling server, the method further comprises:
generating a controlling request of the first terminal.

Optionally, the target terminal refers to a target second terminal among the at least one second terminal, and before the step of sending the controlling request of the target terminal to the controlling server, the method further comprises:
receiving a controlling request generated by the target second terminal.

Optionally, the step of sending the controlling request of the target terminal to the controlling server comprises:
determining a sending terminal of the controlling request generated by the target second terminal;
on the condition that the sending terminal comprises the target second terminal, sending the controlling request of the target second terminal sent by the target second terminal to the controlling server; and
on the condition that the sending terminal does not comprise the target second terminal, sending the controlling request of the target second terminal that is sent by a second terminal other than the target second terminal to the controlling server.

Optionally, the first terminal has a licence to send an information to the controlling server.

Optionally, the first terminal and the second terminal communicate by using a User Datagram Protocol.

Optionally, the first terminal and the second terminal communicate by using the User Datagram Protocol by establishing a socket connection.

The present disclosure further discloses an information synchronization method, wherein the method is applied to at least one second terminal of an information synchronization system, the information synchronization system further comprises a controlling server and a first terminal, the first terminal and the at least one second terminal are located in a same local area network, and the method comprises:
receiving a state feedback information sent by the first terminal, wherein the state feedback information is generated and sent by the controlling server to the first terminal when the controlling server has received a controlling request of a target terminal sent by the first terminal, wherein the target terminal refers to the first terminal or any one of the at least one second terminal; and
according to the state feedback information, updating an information of the second terminal.

Optionally, the target terminal refers to the second terminal, and before the step of receiving the state feedback information sent by the first terminal, the method further comprises:
generating a controlling request of the second terminal; and
sending the controlling request of the second terminal to the first terminal.

Optionally, after the step of generating the controlling request of the second terminal, the method further comprises:

forwarding the controlling request of the second terminal to each of the other second terminals in the information synchronization system.

Optionally, the target terminal refers to the second terminal, and before the receiving the state feedback information sent by the first terminal, the method further comprises:

receiving a controlling request that is generated and sent by any one of the other second terminals in the information synchronization system; and forwarding the controlling request that is generated by the any one of the other second terminals in the information synchronization system to the first terminal.

The present disclosure further discloses a terminal, wherein the terminal comprises a processor, a memory and a computer program that is stored in the memory and is executable in the processor, and the computer program, when executed by the processor, implements the steps of the information synchronization method implemented by the first terminal stated above.

The present disclosure further discloses a computer-readable storage medium, wherein the computer-readable storage medium stores a computer program, and the computer program, when executed by a processor, implements the steps of the information synchronization method implemented by the first terminal stated above.

The present disclosure further discloses a terminal, wherein the terminal comprises a processor, a memory and a computer program that is stored in the memory and is executable in the processor, and the computer program, when executed by the processor, implements the steps of the information synchronization method implemented by the second terminal stated above.

The present disclosure further discloses a computer-readable storage medium, wherein the computer-readable storage medium stores a computer program, and the computer program, when executed by a processor, implements the steps of the information synchronization method implemented by the second terminal stated above.

The present disclosure further discloses an information synchronization system, wherein the information synchronization system comprises a controlling server, a first terminal and at least one second terminal, and the first terminal and the at least one second terminal are located in a same local area network;

the first terminal is configured for sending a controlling request of a target terminal to the controlling server; and according to a state feedback information sent by the controlling server, updating an information of the first terminal, and sending the state feedback information to each of the at least one second terminal, wherein the target terminal refers to the first terminal or any one of the at least one second terminal;

the controlling server is configured for, according to the controlling request, generating the state feedback information, and sending the state feedback information to the first terminal; and the second terminal is configured for, according to the state feedback information, updating an information of the second terminal.

Optionally, the target terminal refers to a target second terminal among the at least one second terminal, and the first terminal is further configured for:

receiving a controlling request generated by the target second terminal.

Optionally, the first terminal is further configured for:

determining a sending terminal of the controlling request generated by the target second terminal;

on the condition that the sending terminal comprises the target second terminal, sending the controlling request of the target second terminal sent by the target second terminal to the controlling server; and on the condition that the sending terminal does not comprise the target second terminal, sending the controlling request of the target second terminal that is sent by a second terminal other than the target second terminal to the controlling server.

Optionally, the target terminal refers to the second terminal, and the second terminal is further configured for:

generating a controlling request of the second terminal; and sending the controlling request of the second terminal to the first terminal.

Optionally, the second terminal is further configured for:

forwarding the controlling request of the second terminal to each of the other second terminals in the information synchronization system.

Optionally, the target terminal refers to the second terminal, and the second terminal is further configured for:

receiving a controlling request that is generated and sent by any one of the other second terminals in the information synchronization system; and forwarding the controlling request that is generated by the any one of the other second terminals in the information synchronization system to the first terminal.

The present disclosure further provides a computer program, wherein the computer program comprises a computer-readable code, and when the computer-readable code is executed on a terminal, the computer-readable code causes the terminal to implement the information synchronization method implemented by the first terminal stated above.

The present disclosure further provides a computer program, wherein the computer program comprises a computer-readable code, and when the computer-readable code is executed on a terminal, the computer-readable code causes the terminal to implement the information synchronization method implemented by the second terminal stated above.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present disclosure are provided below.

BRIEF DESCRIPTION OF THE DRAWINGS

In order to more clearly illustrate the technical solutions of the embodiments of the present disclosure or the related art, the figures that are required to describe the embodiments or the related art will be briefly introduced below. Apparently, the figures that are described below are merely embodiments of the present disclosure, and a person skilled in the art can obtain other figures according to these figures without paying creative work.

DETAILED DESCRIPTION

In order to make the above purposes, features and advantages of the present disclosure more apparent and understandable, the present disclosure will be described in further detail below with reference to the drawings and the particular embodiments. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
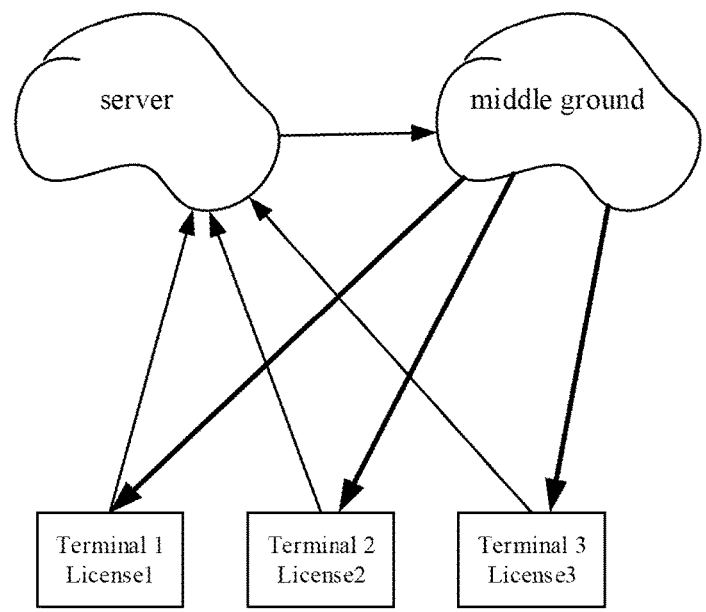
FIG. 1 shows a structural block diagram of an information synchronization system in the related art.
Figure 2:
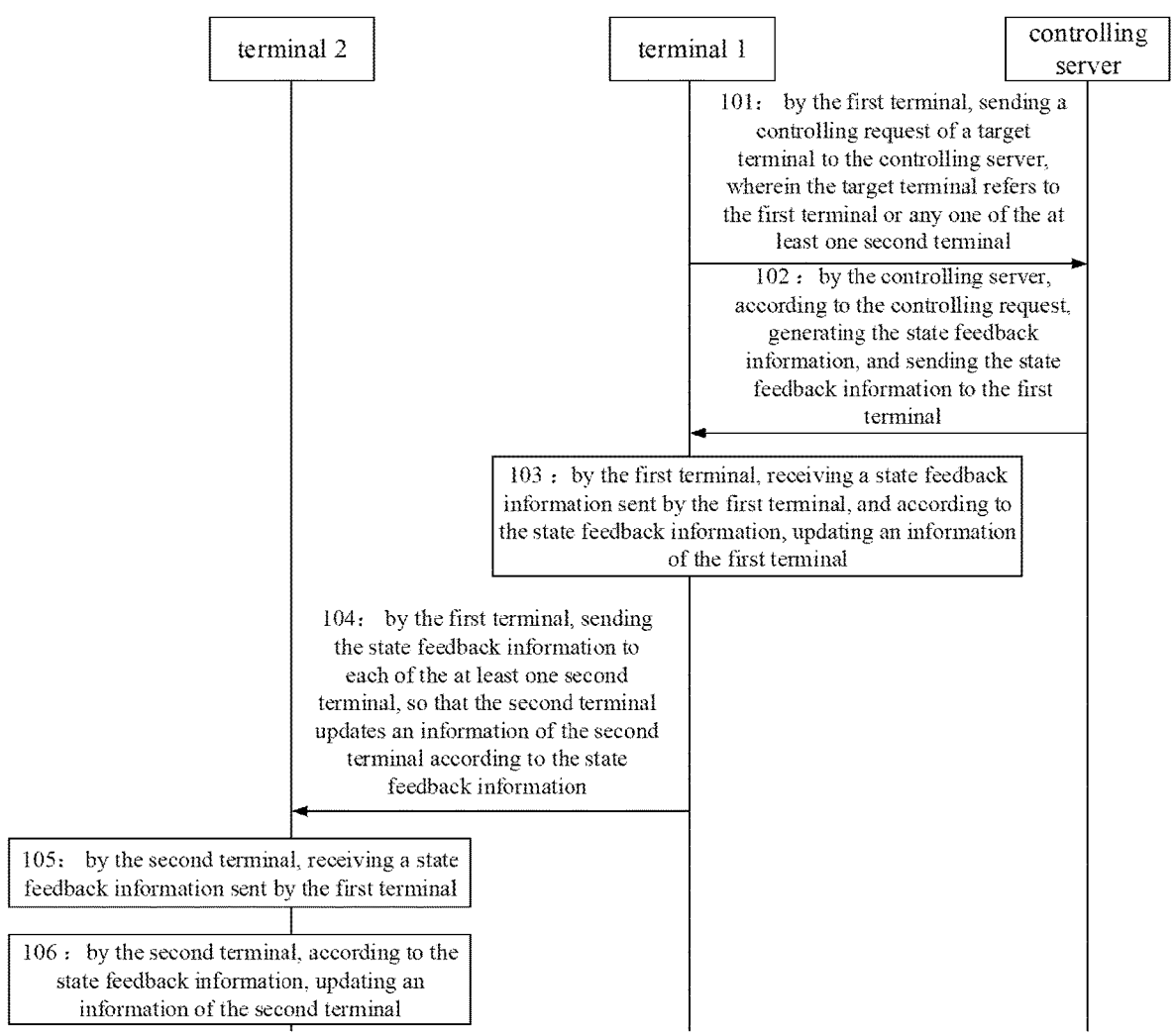
FIG. 2 shows a flow chart of the steps of the information synchronization method according to an embodiment of the present disclosure.
Figure 3:
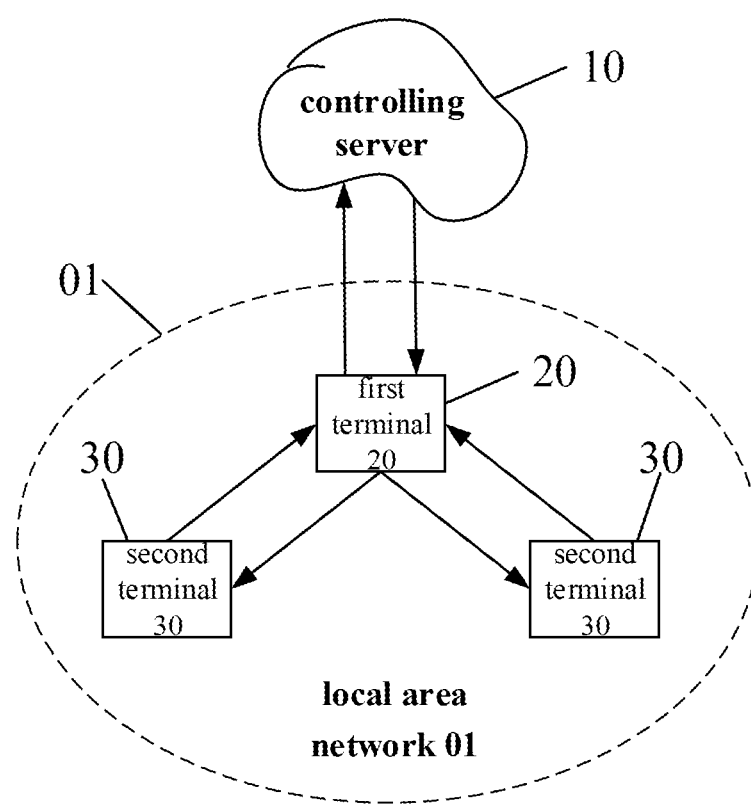
FIG. 3 shows a structural block diagram of the information synchronization system according to an embodiment of the present disclosure.

Referring to FIG. 2, a flow chart of the steps of the information synchronization method according to an embodiment of the present disclosure is shown. The method is applied to an information synchronization system. Referring to FIG. 3, a structural block diagram of the information synchronization system according to an embodiment of the present disclosure is shown. The information synchronization system comprises a controlling server 10, a first terminal 20 and at least one second terminal 30, and the first terminal 20 and the at least one second terminal 30 are located in the same local area network 01. In other words, the first terminal 20 and the second terminal 30 may be distributed terminals in the same local area network 01.

In practical applications, the information synchronization system may particularly be a smart home system, the controlling server 10 may be a home controlling server, and both of the first terminal 20 and the second terminal 30 may be a home controlling terminal, for example, a home control panel and so on. In particular applications, when the user has performed a controlling operation to the smart home on any one of the first terminals 20 and the second terminals 30, for example, a controlling operation on the first terminal 20 of tuning on a lamp A, then the lamp A can be controlled to be turned on, and correspondingly, the icon of the lamp A on the page of the first terminal 20 can be lightened. At this point, it is further required to synchronize the states of the lamp A on the other terminals in the smart home system, or, in other words, it is required to also lighten the icons of the lamp A on the pages of the other terminals in the smart home system, to realize the information synchronization of the lamp A on all of the terminals. The information synchronization method according to the embodiments of the present disclosure will be described below with reference to such an application scene.

Particularly, the method may comprise the following steps:

Step 101: by the first terminal, sending a controlling request of a target terminal to the controlling server, wherein the target terminal refers to the first terminal or any one of the at least one second terminal.

In the embodiment of the present disclosure, the target terminal may be the first terminal or any one of the at least one second terminal in the information synchronization system, or, in other words, the target terminal may be any one of the terminals in the information synchronization system. When the user has performed certain controlling operations on the target terminal in the information synchronization system, for example, an operation of turning on the lamp A, the first terminal may obtain a controlling request of the target terminal, and send the controlling request of the target terminal to a controlling server in an external network.

In the embodiment of the present disclosure, no matter which terminal in the information synchronization system the target terminal is, its controlling request is required to be sent to the controlling server via the first terminal.

Step 102: by the controlling server, according to the controlling request, generating the state feedback information, and sending the state feedback information to the first terminal.

In the embodiment of the present disclosure, the controlling server may receive the controlling request of the target terminal sent by the first terminal, and the state feedback information is generated according to the controlling request of the target terminal. For example, the controlling request of the target terminal may be a controlling request of turning on the lamp A, and accordingly the controlling server may generate a state feedback information for indicating that the lamp A has been turned on. Subsequently, the controlling server may return the state feedback information to the first terminal.

Step 103: by the first terminal, receiving a state feedback information sent by the first terminal, and according to the state feedback information, updating an information of the first terminal.

In the embodiment of the present disclosure, the first terminal may receive the state feedback information sent by the controlling server. The information of the first terminal may particularly be the page information of the first terminal, for example, the state of lightening of an icon on the page of the first terminal, and so on, which is not particularly limited in the embodiments of the present disclosure. For example, if the state feedback information is used for indicating that the lamp A has been turned on, then the first terminal may, according to the state feedback information, lighten the icon of the lamp A on the page of itself from darkness, to enable the user to view on the page of the first terminal that the icon of the lamp A has been lightened, it is thereby known that the lamp A has been turned on.

Step 104: by the first terminal, sending the state feedback information to each of the at least one second terminal, so that the second terminal updates an information of the second terminal according to the state feedback information.

In the embodiment of the present disclosure, the first terminal, after has received the state feedback information sent by the controlling server, may also send the state feedback information to each of the at least one second terminal in the information synchronization system, so that the second terminal updates an information of the second terminal according to the state feedback information. The information of the second terminal may particularly be the page information of the second terminal, for example, the state of lightening of an icon on the page of the second terminal, and so on, which is not particularly limited in the embodiments of the present disclosure.

Step 105: by the second terminal, receiving a state feedback information sent by the first terminal.

In the embodiment of the present disclosure, each of the at least one second terminal in the information synchronization system can receive the state feedback information sent by the first terminal.

Step 106: by the second terminal, according to the state feedback information, updating an information of the second terminal.

In the embodiment of the present disclosure, taking the case as an example in which the state feedback information is used for indicating that the lamp A has been turned on, each of the at least one second terminal, after has received the state feedback information, may, according to the state feedback information, lighten the icon of the lamp A on the page of itself from darkness, to enable the user to view also on the page of each of the at least one second terminal that the icon of the lamp A has been lightened, it is thereby known that the lamp A has been turned on. Both of the first terminal and the second terminal have lightened the icon of the lamp A, or, in other words, each of the terminals in the information synchronization system has realized the information synchronization of the state of the lamp A. Accordingly, the user can view the current state of the lamp A on any one of the terminals in the information synchronization system.

Optionally, in the embodiment of the present disclosure, the first terminal has a licence to send an information to the controlling server. In other words, the license to permit to send the information to the controlling server may be dispatched to merely the first terminal in the information synchronization system, whereby the first terminal in the information synchronization system can serve as a router, to forward the controlling request of the other second terminal in the information synchronization system to the controlling server, and to forward the state feedback information returned by the controlling server to each of the at least one second terminal.

In addition, optionally, the first terminal and the second terminal may communicate by using the User Datagram Protocol (UDP). The UDP protocol has the advantage of a high transmission efficiency, and thus is very extensively applied in wireless networks.

The first terminal and the second terminal may perform the UDP communication by establishing a socket connection. Before broadcasting the data packets, both of the sending party and the receiving party are required to create a Socket object, and specify DatagramPacket data packets to store the data to be sent. Usually, when the UDPSocket service is defined, a fixed port is monitored. In the process of receiving and sending the data, the sending party may invoke the send method of the Socket object to send the data packets, the receiving party may use the receive ( ) method to receive the sent data packets, and at the same time the receive ( ) has the function of obstructing monitoring.

Generally, the sending party of the data may have the following operation steps:

a: starting up a Socket connection;
   b: creating an object (such as multicastSocket), and adding the object to a multicasting group;
   c: creating a class (such as InetAddress);
   d: converting the data packets required to be sent into the byte type;
   e: creating an object (such as DatagramPacket), and specifying the destination address and the port number of the network that the data packets are to be sent to;
   f: invoking the sending method of the object (such as multicastSocket) to send the data packets; and
   g: disconnecting the Socket connection, and leaving the multicasting group.

The receiving party of the data may have the following operation steps:

A: starting up a Socket connection;
   B: creating an object (such as multicastSocket), setting a monitoring port, and adding the UDP port number required to be monitored into the multicasting group;
   C: creating a byte array used for data receiving, and obtaining the ID number of the user and the IP address of the sending party for receiving the data;
   D: creating an empty object (such as DatagramPackage);
   E: receiving the data packets sent by the sending party by using a receiving method, and, simultaneously with the receiving, performing monitoring obstructing;
   F: parsing the received data packets, wherein the data packets comprise data such as the ID of the receiving party, the ID of the sending party, the nickname of the user, the IP address of the user, and the time of the receiving of the data packets; and
   G: disconnecting the Socket connection, and leaving the multicasting group.

It should be noted that the above-described steps of the Socket connection operation between the sending party and the receiving party are merely an illustrative description, and do not limit the present disclosure. In particular applications, the particular process of performing the UDP communication by establishing the Socket connection may refer to the related art, which is not described in detail in the embodiments of the present disclosure.

In the embodiment of the present disclosure, the controlling request of any one of the terminals in the information synchronization system can be sent to the controlling server via the first terminal in the information synchronization system. Therefore, it is merely required to dispatch a license to the first terminal, and it is not required to dispatch a license to the other terminals in the information synchronization system, which saves the cost on the license of the entire system. In addition, the controlling server, according to the state feedback information returned upon the controlling request, can synchronize via the first terminal to each of the terminals in the information synchronization system, whereby each of the terminals in the information synchronization system can update its own information according to the state feedback information, thereby realizing the information synchronization of each of the terminals. Accordingly, it is not required to construct a middleground device used for collectively distributing the state feedback information, which saves the cost on the construction and maintenance of the middleground device.

Figure 4:
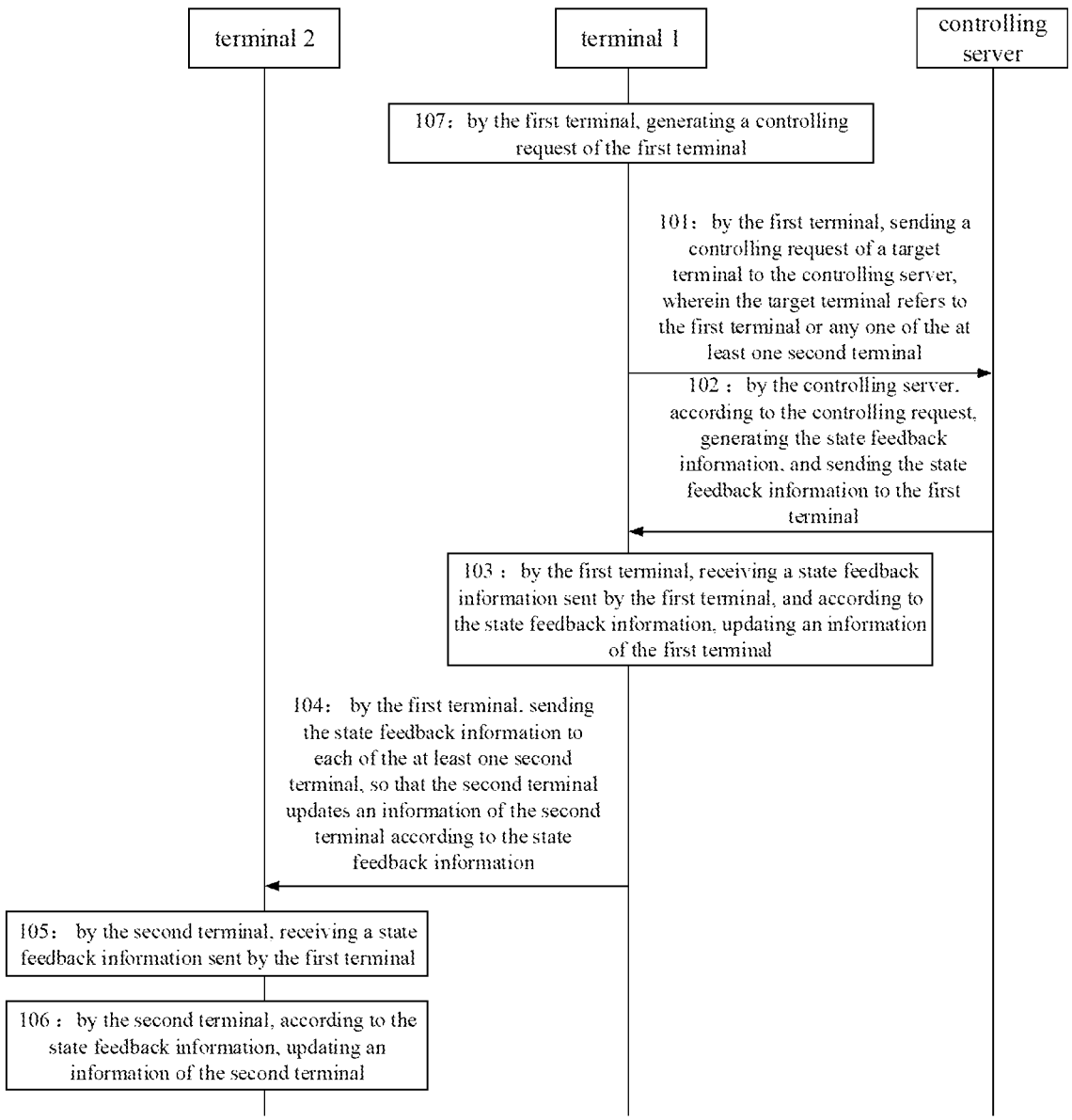
FIG. 4 shows a flow chart of the steps of the information synchronization method according to another embodiment of the present disclosure.

FIG. 4 shows a flow chart of the steps of the information synchronization method according to another embodiment of the present disclosure. Referring to FIG. 4, optionally, when the target terminal is the first terminal, before the step 101, the method may also comprise the following steps:

Step 107: by the first terminal, generating a controlling request of the first terminal.

In this step, the target terminal is the first terminal in the information synchronization system, or, in other words, the user has performed the controlling operation on the first terminal, and accordingly the first terminal may generate a controlling request. Subsequently, the first terminal may send its own controlling request to the controlling server.

Figure 5:
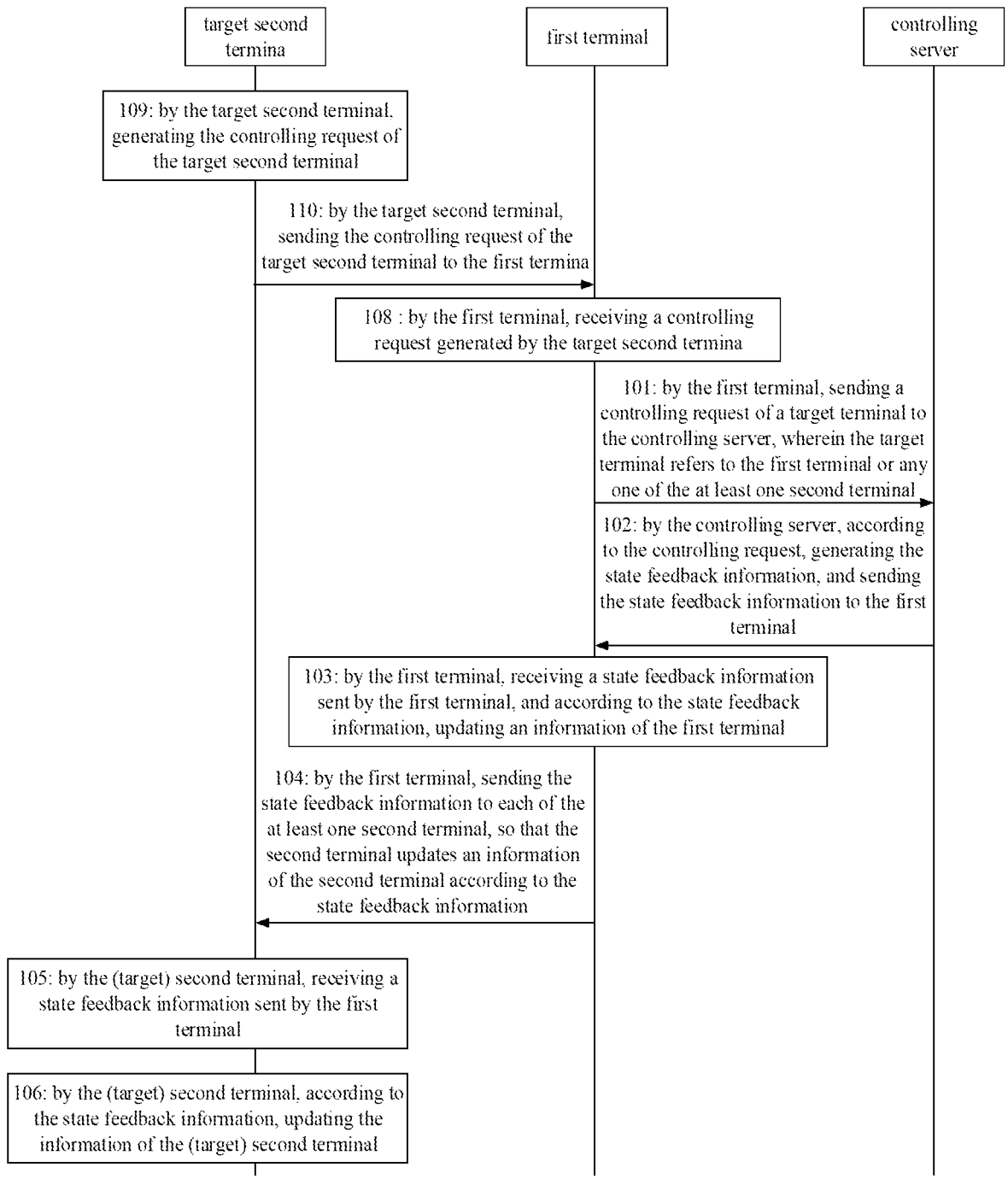
FIG. 5 shows a flow chart of the steps of the information synchronization method according to a third embodiment of the present disclosure.

FIG. 5 shows a flow chart of the steps of the information synchronization method according to a third embodiment of the present disclosure. Referring to FIG. 5, optionally, when the target terminal is the target second terminal among the at least one second terminal, before the step 101, the method may also comprise the following steps:

Step 108: by the first terminal, receiving a controlling request generated by the target second terminal.

In this step, the target terminal is the target second terminal in the information synchronization system, and the target second terminal is any one of the second terminals; in other words, the user has performed the controlling operation on the target second terminal. Accordingly, the target second terminal may generate a controlling request, and send to the first terminal. Subsequently, the first terminal may send the controlling request generated by the target second terminal to the controlling server.

Correspondingly, from the perspective of the second terminal, when the target terminal is the second terminal the method may also comprise the following steps: a controlling request of the second terminal is generated by the second terminal: and the second terminal sends the controlling request of the second terminal to the first terminal. Taking the case as an example in which the target terminal is particularly the target second terminal, the above step is:

Step 109: by the target second terminal, generating the controlling request of the target second terminal.

Step 110: by the target second terminal, sending the controlling request of the target second terminal to the first terminal.

In other words, the first terminal may receive the controlling request that is sent directly by the target second terminal and is generated by the target second terminal itself.

Figure 6:
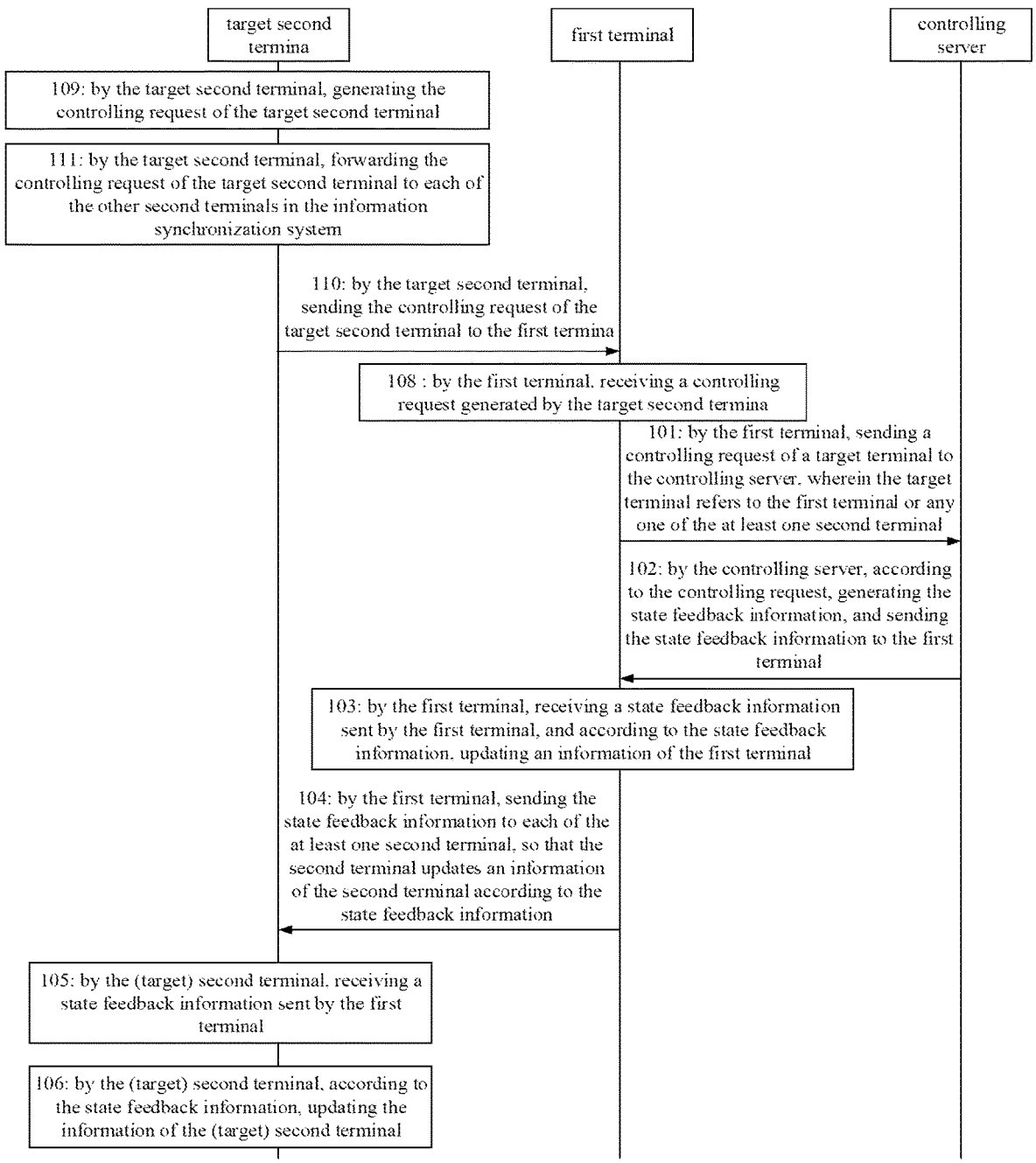
FIG. 6 shows a flow chart of the steps of the information synchronization method according to a fourth embodiment of the present disclosure.

FIG. 6 shows a flow chart of the steps of the information synchronization method according to a fourth embodiment of the present disclosure. Referring to FIG. 6, optionally, when the target terminal is the second terminal, the method may also comprise the following steps: by the second terminal, forwarding the controlling request of the second terminal to each of the other second terminals in the information synchronization system.

Taking the case as an example in which the target terminal is particularly the target second terminal, the above step is:

Step 111: by the target second terminal, forwarding the controlling request of the target second terminal to each of the other second terminals in the information synchronization system.

In the embodiment of the present disclosure, the first terminal and the target second terminal may communicate by using the UDP protocol. However, although the UDP protocol has a high speed of the data transmission the data transmission has a low reliability; in other words, there is possibility of losing of the data packets. Therefore, in order to improve the reliability of the data transmission between the terminals, a mechanism of cross-checking between the terminals is added. In other words, besides the first terminal directly connected to the controlling server, each of the at least one second terminal in the information synchronization system, after have generated its own controlling request, may send the controlling request to the first terminal directly by itself, and may further simultaneously forward its own controlling request to each of the other second terminals in the information synchronization system, whereby the each of the other second terminals forwards the controlling request to the first terminal, to prevent the problem of packet losing in the process of the sending of the controlling request by the second terminal generating the controlling request.

In other words, when the target terminal is the second terminal, and before the receiving the state feedback information sent by the first terminal, the method may also comprise the following steps: the second terminal receives a controlling request that is generated and sent by any one of the other second terminals in the information synchronization system; and the second terminal forwards the controlling request that is generated by the any one of the other second terminals in the information synchronization system to the first terminal.

Taking the case as an example in which the target terminal is particularly the target second terminal, in other words, after the forwarding of a controlling information generated by itself to each of the other second terminals from the target second terminal in the information synchronization system, the each of the other second terminals in the information synchronization system may receive the controlling request generated and sent by the target second terminal, and the each of the other second terminals may further forward the controlling request of the target second terminal to the first terminal.

Correspondingly, the step 101 may particularly comprise: by the first terminal, determining a sending terminal of the controlling request generated by the target second terminal; on the condition that the sending terminal comprises the target second terminal, by the first terminal, sending to the controlling server the controlling request of the target second terminal sent by the target second terminal; and on the condition that the sending terminal does not comprise the target second terminal, by the first terminal, sending the controlling request of the target second terminal that is forwarded by a second terminal other than the target second terminal to the controlling server.

The first terminal may parse the packet heads of the data packets of each of the received controlling requests, thereby determining which second terminal the sending party of each of the controlling requests is. If none of the data of the at least one second terminal has a lost packet, the first terminal may receive the controlling request that is generated by itself and is sent by the target second terminal, and may further receive the controlling request of the target second terminal that is forwarded by the each of the other second terminals. In this case, the first terminal automatically ignores the controlling request forwarded by the each of the other second terminals, and sends the controlling request sent by the target second terminal to the controlling server.

In addition, if the target second terminal has a lost packet, and the first terminal cannot receive the controlling request that is generated by itself and from the target second terminal, the first terminal sends the controlling request forwarded by any one of the remaining second terminals to the controlling server.

In other words, among the controlling requests received by the first terminal, if there is a controlling request whose sending party is the generating party of the controlling request, the first terminal sends the controlling request whose sending party is its generating party to the controlling server, and ignores the other controlling requests. If there is no controlling request whose sending party is the generating party of the controlling request, the first terminal sends any one of the forwarded controlling requests to the controlling server.

Figure 7:
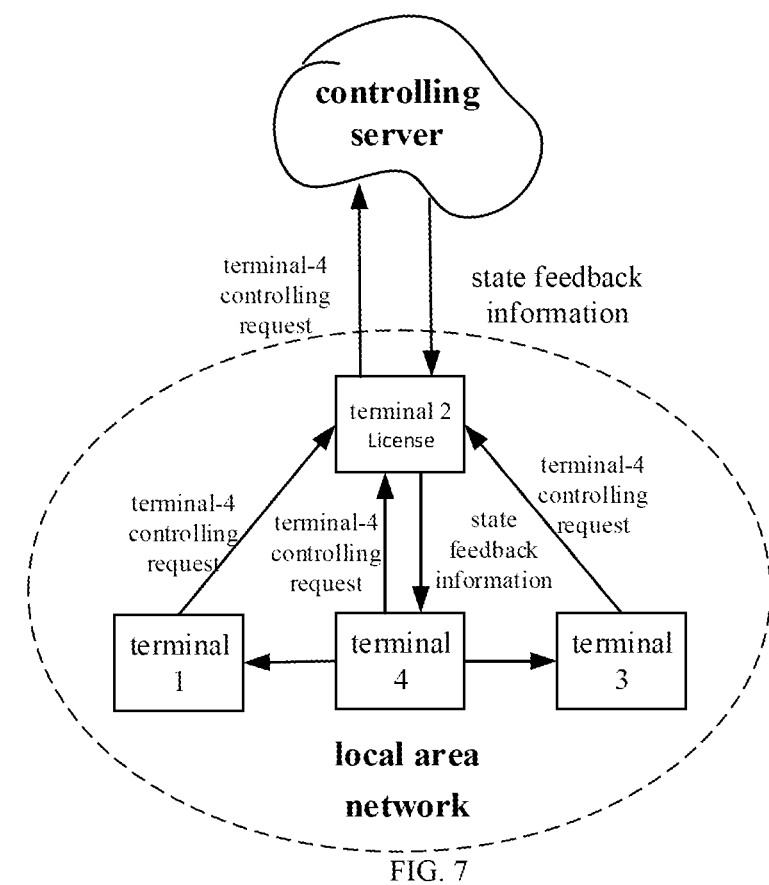
FIG. 7 shows a schematic diagram of a particular information synchronization system according to an embodiment of the present disclosure.

Referring to FIG. 7, a schematic diagram of a particular information synchronization system according to an embodiment of the present disclosure is shown. The information synchronization method according to the embodiments of the present disclosure will be described particularly below with reference to FIG. 7. In FIG. 7, the first terminal may particularly be a terminal 2, the terminal 2 has a licence to send an information to the controlling server, and the second terminal may include a terminal 1, a terminal 3 and a terminal 4.

If the terminal 2 generates a terminal-2 controlling request, then the terminal 2 may send the terminal-2 controlling request to the controlling server directly, and then the controlling server may, according to the terminal-2 controlling request, generate the state feedback information, and send the state feedback information to the terminal 2. When the terminal 2 receives the state feedback information, the terminal 2 may update the page information of the terminal 2 according to the state feedback information, and simultaneously the terminal 2 may further send the state feedback information individually to the terminal 1, the terminal 3 and the terminal 4. When the terminal 1 receives the state feedback information, the terminal 1 may update the page information of the terminal 1 according to the state feedback information. When the terminal 3 received the state feedback information, the terminal 3 may update the page information of the terminal 3 according to the state feedback information. When the terminal 4 receives the state feedback information, the terminal 4 may update the page information of the terminal 4 according to the state feedback information.

Referring to FIG. 7, if the terminal 4 generates a terminal-4 controlling request, the terminal 4 may send the terminal-4 controlling request to the terminal 2. In order to ensure the reliability of the transmission, the terminal 4 may simultaneously send the terminal-4 controlling request to the terminal 1 and the terminal 3. In turn, the terminal 1 may forward the terminal-4 controlling request to the terminal 2, and the terminal 3 may also forward the terminal-4 controlling request to the terminal 2. When the terminal 2 has received the terminal-4 controlling request sent by the terminal 4, it automatically ignores the terminal-4 controlling requests forwarded by the terminal 1 and the terminal 3. If the terminal 2 does not receive the terminal-4 controlling request sent by the terminal 4, then it executes the terminal-4 controlling request forwarded by the terminal 1 or the terminal 3, thereby improving the reliability of the UDP packet transmission.

In the embodiment of the present disclosure, the first terminal may send the controlling request of a target terminal in the information synchronization system to the controlling server. Subsequently, the controlling server may, according to the controlling request, generate the state feedback information, and return the state feedback information to the first terminal. The first terminal may, according to the state feedback information, update an information of the first terminal, and send the state feedback information to each of the second terminals, so that each of the second terminals update its own information according to the state feedback information, thereby realizing the information synchronization of each of the terminals. In the embodiment of the present disclosure, the controlling request of any one of the terminals in the information synchronization system can be sent to the controlling server via the first terminal in the information synchronization system, so it is merely required to dispatch a license to the first terminal, which saves the cost on the license of the entire system. In addition, the controlling server, according to the state feedback information returned upon the controlling request, can synchronize via the first terminal to each of the terminals in the information synchronization system, accordingly, it is not required to construct a middleground device used for collectively distributing the state feedback information, which saves the cost on the construction and maintenance of the middleground device.

An embodiment of the present disclosure further provides an information synchronization system. Referring to FIG. 3, the information synchronization system comprises a controlling server 10, a first terminal 20 and at least one second terminal 30, and the first terminal 20 and the at least one second terminal 30 are located in the same local area network 01;

the first terminal 20 is configured for sending a controlling request of a target terminal to the controlling server; and according to a state feedback information sent by the controlling server, updating an information of the first terminal, and sending the state feedback information to each of the second terminals, wherein the target terminal refers to the first terminal or any one of the second terminals;

the controlling server 10 is configured for, according to the controlling request, generating the state feedback information, and sending the state feedback information to the first terminal; and the second terminal 30 is configured for, according to the state feedback information, updating an information of the second terminal.

Optionally, the first terminal is further configured for: generating a controlling request of the first terminal.

Optionally, the first terminal is further configured for: receiving a controlling request generated by the target second terminal.

Optionally, the first terminal is particularly configured for: determining a sending terminal of the controlling request generated by the target second terminal;

on the condition that the sending terminal comprises the target second terminal, sending the controlling request of the target second terminal sent by the target second terminal to the controlling server; and on the condition that the sending terminal does not comprise the target second terminal, sending the controlling request of the target second terminal that is sent by a second terminal other than the target second terminal to the controlling server.

Optionally, the first terminal has a licence to send an information to the controlling server.

Optionally, the first terminal and the second terminal communicate by using a User Datagram Protocol.

Optionally, the target terminal refers to the second terminal, and the second terminal is further configured for:

generating a controlling request of the second terminal; and sending the controlling request of the second terminal to the first terminal.

Optionally, the second terminal is further configured for: forwarding the controlling request of the second terminal to each of the other second terminals in the information synchronization system.

Optionally, the target terminal refers to the second terminal, and the second terminal is further configured for:

receiving a controlling request that is generated and sent by any one of the other second terminals in the information synchronization system; and forwarding the controlling request that is generated by the any one of the other second terminals in the information synchronization system to the first terminal.

In the embodiment of the present disclosure, the first terminal may send the controlling request of a target terminal in the information synchronization system to the controlling server. Subsequently, the controlling server may, according to the controlling request, generate the state feedback information, and return the state feedback information to the first terminal. The first terminal may, according to the state feedback information, update an information of the first terminal, and send the state feedback information to each of the at least one second terminal, so that each of the at least one second terminal update its own information according to the state feedback information, thereby realizing the information synchronization of each of the terminals. In the embodiment of the present disclosure, the controlling request of any one of the terminals in the information synchronization system can be sent to the controlling server via the first terminal in the information synchronization system, so it is merely required to dispatch a license to the first terminal, which saves the cost on the license of the entire system. In addition, the controlling server, according to the state feedback information retuned upon the controlling request, can synchronize via the first terminal to each of the terminals in the information synchronization system, accordingly, it is not required to construct a middleground device used for collectively distributing the state feedback information, which saves the cost on the construction and maintenance of the middleground device.

An embodiment of the present disclosure further discloses a terminal, wherein the terminal comprises a processor, a memory and a computer program that is stored in the memory and is executable in the processor, and the computer program, when executed by the processor, implements the steps of the information synchronization method stated above.

An embodiment of the present disclosure further discloses a computer-readable storage medium, wherein the computer-readable storage medium stores a computer program, and the computer program, when executed by a processor, implements the steps of the information synchronization method stated above.

Regarding the above-described process embodiments, for brevity of the description, all of them are expressed as the combination of a series of actions, but a person skilled in the art should know that the present disclosure is not limited by the sequences of the actions that are described, because, according to the present disclosure, some of the steps may have other sequences or be performed simultaneously. Secondly, a person skilled in the art should also know that all of the embodiments described in the description are preferable embodiments, and not all of the actions and the modules that they involve are required by the present disclosure.

The above-described device embodiments are merely illustrative, wherein the units that are described as separate components may or may not be physically separate, and the components that are displayed as units may or may not be physical units; in other words, they may be located at the same one location, and may also be distributed to a plurality of network units. Some or all of the modules may be selected according to the actual demands to realize the purposes of the solutions of the embodiments. A person skilled in the art can understand and implement the technical solutions without paying creative work.

Each component embodiment of the present disclosure may be implemented by hardware, or by software modules that are operated on one or more processors, or by a combination thereof. A person skilled in the art should understand that some or all of the functions of some or all of the components of the terminal according to the embodiments of the present disclosure may be implemented by using a microprocessor or a digital signal processor (DSP) in practice. The present disclosure may also be implemented as apparatus or device programs (for example, computer programs and computer program products) for implementing part of or the whole of the method described herein. Such programs for implementing the present disclosure may be stored in a computer-readable medium, or may be in the form of one or more signals. Such signals may be downloaded from an Internet website, or provided on a carrier signal, or provided in any other forms.

Figure 8:
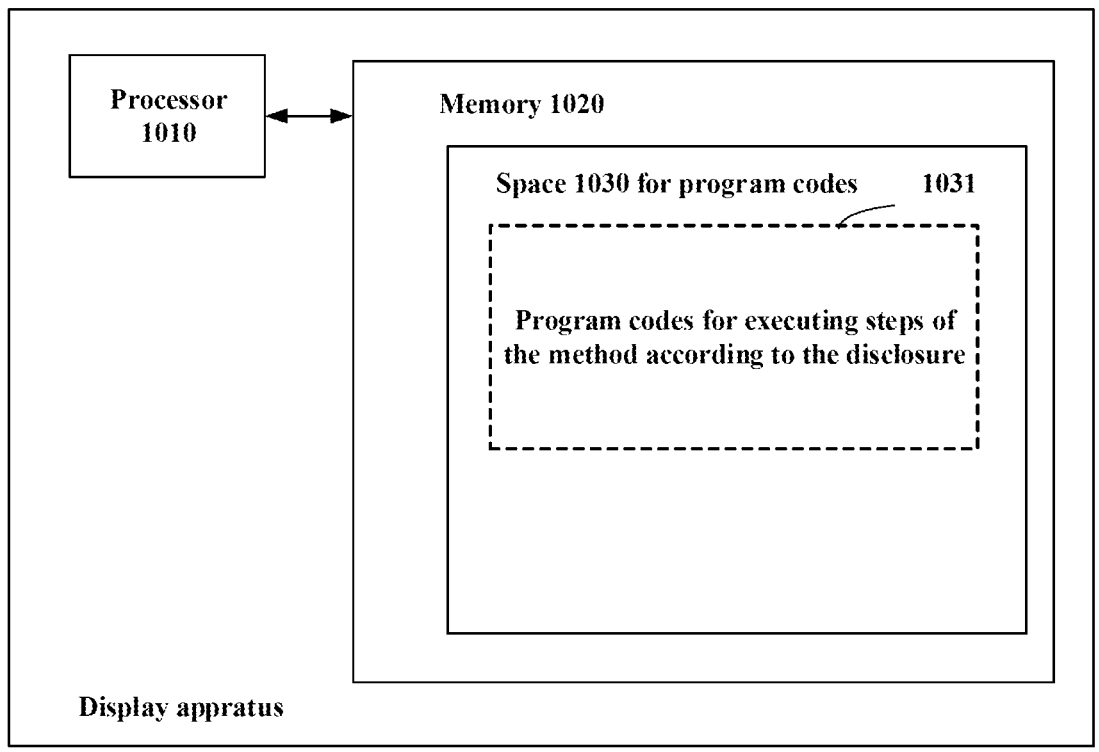
FIG. 8 schematically shows a block diagram of a terminal for implementing the method according to the present disclosure.
Figure 9:
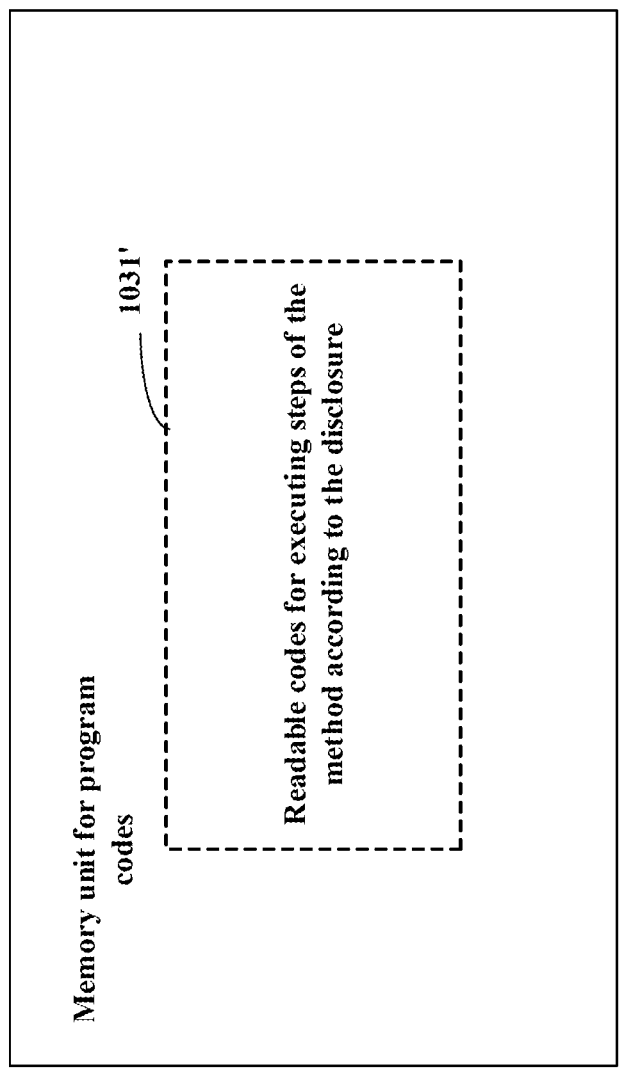
FIG. 9 schematically shows a storage unit for maintaining or carrying a program code for implementing the method according to the present disclosure.

For example, FIG. 8 shows a terminal that can implement the method according to the present disclosure. The terminal traditionally comprises a processor 1010 and a computer program product or computer-readable medium in the form of a memory 1020. The memory 1020 may be electronic memories such as flash memory. EEPROM (Electrically Erasable Programmable Read Only Memory), EPROM, hard disk or ROM. The memory 1020 has the storage space 1030 of the program code 1031 for implementing any steps of the above method. For example, the storage space 1030 for program code may contain program codes 1031 for individually implementing each of the steps of the above method. Those program codes may be read from one or more computer program products or be written into the one or more computer program products. Those computer program products include program code carriers such as a hard disk, a compact disk (CD), a memory card or a floppy disk. Such computer program products are usually portable or fixed storage units as shown in FIG. 9. The storage unit may have storage segments or storage spaces with similar arrangement to the memory 1020 of the terminal in FIG. 8. The program codes may, for example, be compressed in a suitable form. Generally, the storage unit contains a computer-readable code 1031', which can be read by a processor like 1010. When those codes are executed by the terminal, the codes cause the terminal to implement each of the steps of the method described above.

The embodiments of the description are described in the mode of progression, each of the embodiments emphatically describes the differences from the other embodiments, and the same or similar parts of the embodiments may refer to each other.

Finally, it should also be noted that, in the present text, relation terms such as first and second are merely intended to distinguish one entity or operation from another entity or operation, and that does not necessarily require or imply that those entities or operations have therebetween any such actual relation or order. Furthermore, the terms "include", "comprise" or any variants thereof are intended to cover non-exclusive inclusions, so that processes, methods, articles or devices that include a series of elements do not only include those elements, but also include other elements that are not explicitly listed, or include the elements that are inherent to such processes, methods, articles or devices. Unless further limitation is set forth, an element defined by the wording "comprising a . . . " does not exclude additional same element in the process, method, article or device comprising the element.

The information synchronization method, the terminal and the information synchronization system according to the present disclosure has been described in detail above. The principle and the embodiments of the present disclosure are described herein with reference to the particular examples, and the description of the above embodiments is merely intended to facilitate to understand the method according to the present disclosure and its core concept. Moreover, for a person skilled in the art, according to the concept of the present disclosure, the particular embodiments and the range of application may be varied. In conclusion, the contents of the description should not be understood as limiting the present disclosure.

The invention claimed is:

1. An information synchronization method, wherein the method is applied to a first terminal of an information synchronization system, the information synchronization system further comprises a controlling server and at least one second terminal, the first terminal and the at least one second terminal are located in a same local area network, and the method comprises:
sending a controlling request of a target terminal to the controlling server, wherein the target terminal refers to the first terminal or any one of the at least one second terminal;
receiving a state feedback information sent by the controlling server, and according to the state feedback information, updating an information of the first terminal; and
sending the state feedback information to each of the at least one second terminal, so that each of the at least one second terminal updates an information of the each of the at least one second terminal according to the state feedback information;
wherein the target terminal refers to a target second terminal among the at least one second terminal, and before the step of sending the controlling request of the target terminal to the controlling server, the method further comprises:
receiving a controlling request generated by the target second terminal; and
receiving the controlling request of the target terminal that is generated by the target second terminal and forwarded by each second terminal other than the target second terminal;
wherein the step of sending the controlling request of the target terminal to the controlling server comprises:
determining terminals that have sent the controlling request generated by the target second terminal;
on the condition that the terminals that have sent the controlling request generated by the target second terminal comprise the target second terminal, sending the controlling request of the target second terminal sent by the target second terminal to the controlling server; and
on the condition that the terminals that have sent the controlling request generated by the target second terminal do not comprise the target second terminal, sending the controlling request of the target second terminal that is forwarded by a second terminal other than the target second terminal to the controlling server.

2. The method according to claim 1, wherein the target terminal refers to the first terminal, and before the sending the controlling request of the target terminal to the controlling server, the method further comprises:
generating a controlling request of the first terminal.

3. The method according to claim 1, wherein the first terminal has a license to send an information to the controlling server.

4. The method according to claim 1, wherein the first terminal and the second terminal communicate by using a User Datagram Protocol.

5. The method according to claim 4, wherein the first terminal and the second terminal communicate by using the User Datagram Protocol by establishing a socket connection.

6. A terminal, wherein the terminal comprises a processor, a memory and a computer program that is stored in the memory and is executable in the processor, and the computer program, when executed by the processor, implements the steps of the information synchronization method according to claim 1.

7. A non-transitory computer-readable storage medium, wherein the computer-readable storage medium stores a computer program, and the computer program, when executed by a processor, implements the steps of the information synchronization method according to claim 1.

8. An information synchronization method, wherein the method is applied to at least one second terminal of an information synchronization system, the information synchronization system further comprises a controlling server and a first terminal, the first terminal and the at least one second terminal are located in a same local area network, and the method comprises:
receiving a state feedback information sent by the first terminal, wherein the state feedback information is generated and sent by the controlling server to the first terminal when the controlling server has received a controlling request of a target terminal sent by the first terminal, wherein the target terminal refers to the first terminal or any one of the at least one second terminal; and
according to the state feedback information, updating an information of the second terminal;
on the condition that the second terminal is the target terminal, before the step of receiving the state feedback information sent by the first terminal, the method further comprises:
generating a controlling request of the second terminal; and
sending the controlling request of the second terminal to the first terminal,
after the step of generating the controlling request of the second terminal, the method further comprises forwarding the controlling request of the second terminal to each of the other second terminals in the information synchronization system,
on the condition that the second terminal is not a second terminal that generates the controlling request, before the step of receiving the state feedback information sent by the first terminal, the method further comprises:
receiving the controlling request that is generated and sent by any one of the other second terminals in the information synchronization system; and
forwarding the controlling request that is generated by the any one of the other second terminals in the information synchronization system to the first terminal.

9. A terminal, wherein the terminal comprises a processor, a memory and a computer program that is stored in the memory and is executable in the processor, and the computer program, when executed by the processor, implements the steps of the information synchronization method according to claim 8.

10. A non-transitory computer-readable storage medium, wherein the computer-readable storage medium stores a computer program, and the computer program, when executed by a processor, implements the steps of the information synchronization method according claim 8.

11. An information synchronization system, wherein the information synchronization system comprises a controlling server, a first terminal and at least one second terminal, and the first terminal and the at least one second terminal are located in a same local area network;

the first terminal is configured for sending a controlling request of a target terminal to the controlling server; and according to a state feedback information sent by the controlling server, updating an information of the first terminal, and sending the state feedback information to each of the at least one second terminal, wherein the target terminal refers to the first terminal or any one of the at least one second terminal;

the controlling server is configured for, according to the controlling request, generating the state feedback information, and sending the state feedback information to the first terminal; and the second terminal is configured for, according to the state feedback information, updating an information of the second terminal, wherein the target terminal refers to a target second terminal among the at least one second terminal, and the first terminal is further configured for:

receiving the controlling request generated by the target second terminal;

receiving the controlling request of the target terminal that is generated by the target second terminal and forwarded by each second terminal other than the target second terminal;

determining terminals that have sent the controlling request generated by the target second terminal;

on the condition that the terminals that have sent the controlling request generated by the target second terminal comprise the target second terminal, sending the controlling request of the target second terminal sent by the target second terminal to the controlling server; and on the condition that the terminals that have sent the controlling request generated by the target second terminal do not comprise the target second terminal, sending the controlling request of the target second terminal that is forwarded by a second terminal other than the target second terminal to the controlling server.

\* \* \* \* \*